United States Patent
Fugel et al.

(10) Patent No.: US 8,821,028 B2
(45) Date of Patent: Sep. 2, 2014

(54) AXIAL BEARING ASSEMBLY

(75) Inventors: Wolfgang Fugel, Nürnberg (DE);
Andreas Kirschner, Aurachtal (DE);
Alexander Reimchen, Herzogenaurach (DE); Martin Gegner, Uehlfeld (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 13/879,480

(22) PCT Filed: Jul. 11, 2011

(86) PCT No.: PCT/EP2011/061764
§ 371 (c)(1),
(2), (4) Date: May 14, 2013

(87) PCT Pub. No.: WO2012/048918
PCT Pub. Date: Apr. 19, 2012

(65) Prior Publication Data
US 2013/0223786 A1    Aug. 29, 2013

(30) Foreign Application Priority Data
Oct. 14, 2010 (DE) .......................... 10 2010 048 479

(51) Int. Cl.
*F16C 33/46* (2006.01)
*F16C 33/58* (2006.01)

(52) U.S. Cl.
USPC ........................................................ 384/621

(58) Field of Classification Search
USPC ........... 384/590, 593, 618–623; 475/331, 346
See application file for complete search history.

(56) References Cited

U.S. PATENT DOCUMENTS 4,934,842 A * 6/1990 Premiski et al. .............. 384/606
5,335,998 A * 8/1994 Muntnich et al. ............. 384/622

(Continued)

FOREIGN PATENT DOCUMENTS

DE    19750805    5/1999
DE    10130458    9/2002

(Continued)

*Primary Examiner* — Phillip A Johnson
(74) *Attorney, Agent, or Firm* — Volpe and Koenig, P.C.

(57) ABSTRACT

An axial bearing assembly which essentially is formed of two axial rolling bearings (1, 2) between which a circular ring-shaped carrier component (3) is arranged. Each of the axial rolling bearings (1, 2) has a first ring-shaped bearing disk (6, 7) seated against one of the axial sides (4, 5) of the carrier component (3) and a second ring-shaped bearing disk (8, 9) for fastening to additional components of the surrounding construction which are arranged axially on both sides of the carrier component (3) and which each consist of a thin steel plate. A plurality of rolling elements (14, 15) arranged next to each other additionally roll between the axial inner sides (10, 11 and 12, 13) of the bearing discs (6, 7, 8, 9) and are held at a uniform spacing from each other by a respective bearing cage (16, 17) and together therewith form a needle roller and cage assembly (18, 19). Additional recesses (21) are arranged on the inside diameter (20) of the circular ring-shaped carrier component (3), and at the same time the first bearing discs (6, 7) of both axial rolling bearings (1, 2) are interconnected via a centering collar (22) guided through the inside diameter (20) of the carrier component (3) on the one first bearing disk (6), and via outward moldings (24) on the centering collar (22) of the one first bearing disk (6) which are complementary to the recesses (21) on the carrier component (3), and via inward moldings (26) on the inside diameter side (25) of the other first bearing disk (7) which are complementary to the outward moldings (24) on the centering collar (22), in a manner that prevents faulty assembly, and are secured to the carrier component (3) in a captive and rotationally fixed manner.

9 Claims, 3 Drawing Sheets

(56) References Cited

U.S. PATENT DOCUMENTS

| | | |
|---|---|---|
| 6,857,787 B1 * | 2/2005 | Meier et al. ............... 384/619 |
| 7,608,005 B2 * | 10/2009 | Metten et al. ............. 475/159 |
| 2005/0232529 A1 | 10/2005 | Muntnich et al. |
| 2006/0193549 A1 | 8/2006 | Fugel et al. |
| 2009/0252449 A1 | 10/2009 | Fugel et al. |

FOREIGN PATENT DOCUMENTS

| | | |
|---|---|---|
| DE | 602005001069 | 1/2008 |
| DE | 102008016880 | 10/2009 |
| DE | 10306926 | 2/2012 |
| EP | 1627750 | 2/2006 |
| WO | 2004038243 | 5/2004 |

* cited by examiner

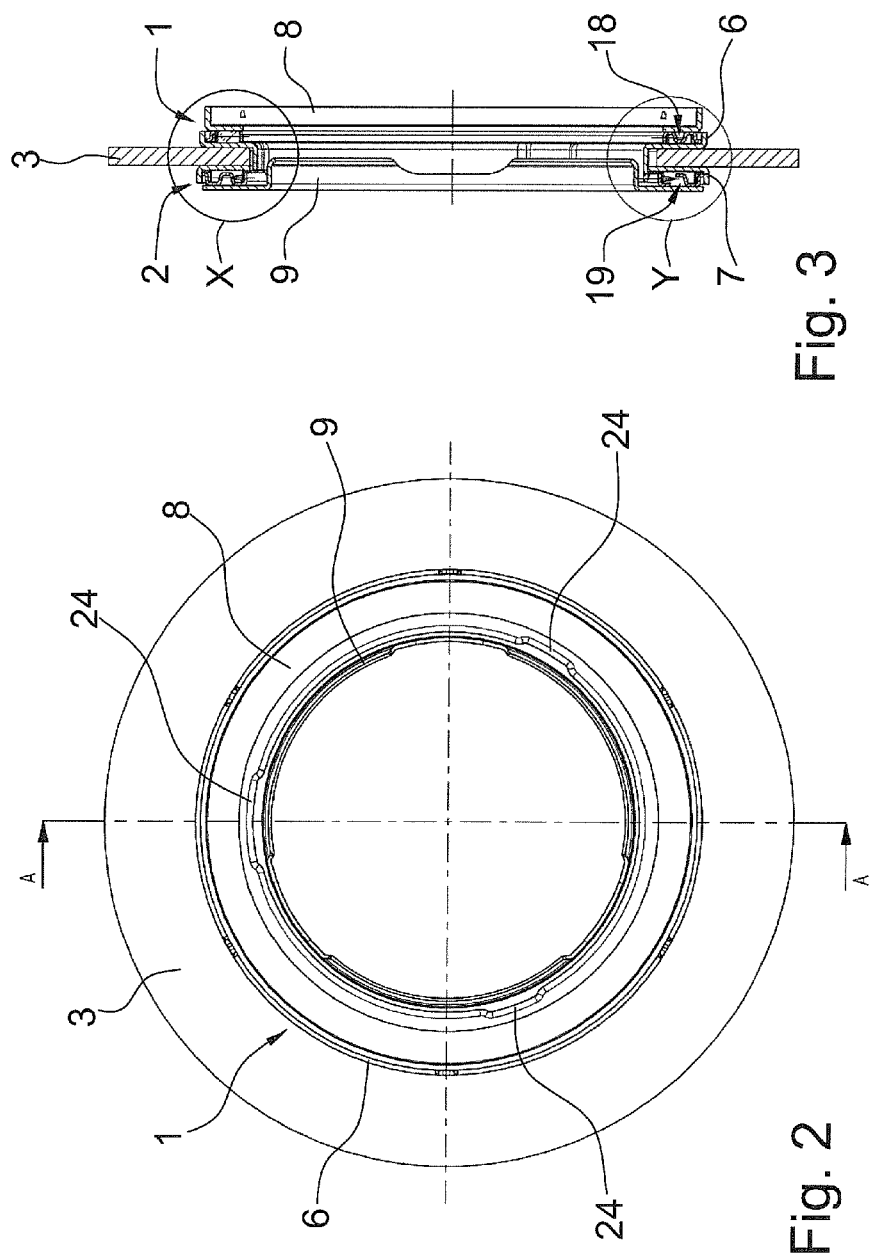

AXIAL BEARING ASSEMBLY

FIELD OF THE INVENTION

The invention relates to an axial bearing assembly and it is advantageously suitable, in particular, for the two-sided axial support of the planet-wheel carrier of a planetary gear train in an automatic transmission of a passenger car by means of two axial needle bearings.

BACKGROUND

The most common embodiment of automatic transmissions in passenger cars is the so-called torque converter transmission that differs from conventional and automatic shifting gearboxes primarily by a shifting process that is free from breaks in the traction force. Such automatic transmissions in passenger cars usually have a hydraulic torque converter as a starter coupling and are comprised essentially from several plate couplings and also a combination of several free-running wheels and planetary gears. All of the shifting and coupling processes are performed via the plate couplings that produce the non-positive fit connection of the individual planetary gear stages to the input and output shafts of the automatic transmission.

Because considerable axial forces also act between the gearbox components during the individual shifting processes due to the usually helical planet wheels of the planetary gear train, to avoid friction losses and reduced efficiency, the individual coupling and planet-wheel carriers are each supported, depending on the shift gear number, by up to 17 axial needle bearings relative to each other. In special cases, individual coupling or planet wheel carriers must be supported in the axial direction even on both sides against two additional adjacent gearbox components. For supporting the planet-wheel carrier against the adjacent sun wheel of a planetary gear train on one side and also against an adjacent belt pulley on the other side, an axial bearing assembly is known, for example, from DE 60 2005 001 069 T2, which is made essentially from two conventional axial needle bearings, with the circular ring-shaped side wall of the planet-wheel carrier being arranged between these axial needle bearings. Here, each of the two axial rolling bearings has, in a known way, a first ring-shaped bearing disk adjacent to one of the axial sides of the planet-wheel carrier and a second ring-shaped bearing disk mounted on the adjacent sun wheel or on the adjacent belt pulley, with each bearing disk being made from one thinner steel plate and one thicker steel plate. A plurality of bearing needles arranged in series one next to the other rolls between the axial inner sides of the bearing disks. These bearing needles are each held by a bearing cage in a uniform spacing relative to each other and together with the bearing cage form a needle-roller assembly.

In the assembly of such automatic transmissions, however, in practice it has been shown that the use of axial needle bearings in the provided bearing positions and the use of the carrier part supported by the axial needle bearings is associated with considerable time costs due to the relatively large number of individual parts and the necessary precision and therefore is very expensive. The usually manual assembly of the two axial needle bearings also has the risk that one of the axial needle bearings will be unintentionally left out or they will be installed on the wrong side of the carrier part to be supported and/or of the bearing disks due to their identical construction and size. This can result in faulty final assemblies that already cause faulty functions when the gearbox is started up or the different plate thicknesses of the bearing rings of the two axial needle bearings lead to axial stresses that result in increased wear of the axial needle bearings and thus to the premature failure of the gearbox when the automatic transmission is running.

SUMMARY

Starting with the disadvantages described for the known prior art, the invention is based on the objective of designing an axial bearing assembly of the described type in which it is guaranteed that one of the axial rolling bearings cannot be unintentionally left out and that faulty assembly of the axial rolling bearings is excluded and wherein the costs for using the carrier part supported by the axial rolling bearings is considerably reduced.

According to the invention, this objective is met with an axial bearing assembly in which additional recesses are arranged on the inner diameter of the circular ring-shaped carrier part and the first bearing disks of both axial rolling bearings are connected to each other in a manner that prevents faulty assembly and are also attached on the carrier part in a captive and rotationally locked manner by a centering collar guided through the inner diameter of the carrier part on the one first bearing disk and also by means of outward moldings on the centering collar of the one first bearing disk, wherein these outward moldings are complementary to the recesses on the carrier part, and by means of inward moldings on the inner diameter side of the other first bearing disk, wherein these inward moldings are complementary to the outward moldings on the centering collar, so that the carrier part preassembled unit together with the first bearing disks and the needle-roller assemblies located thereon are inherently alignable via the inward moldings, the outward moldings, and the recesses to form a pre-assembled unit.

Preferred constructions and advantageous refinement of the axial bearing assembly according to the invention are described in the dependent claims.

According to one embodiment of the invention, in the axial bearing assembly formed according to the invention it is provided that the axial length of the centering collar on the one first bearing disk is larger than the axial width of the carrier part plus the sheet thickness of the other first bearing disk and that the outer diameter of the centering collar on the one first bearing disk is slightly smaller than the inner diameter of the other first bearing disk and the carrier part. Such dimensioning of the two first bearing disks is a prerequisite for the condition that the two axial rolling bearings can be connected to each other through the carrier part, wherein the extended centering collar on the one first bearing disk of the one axial rolling bearing advantageously simultaneously forms an inner bearing rim for the rolling body of the other axial rolling bearing.

According to another feature of the axial bearing assembly formed according to the invention is that several catch tabs that are directed outward in the radial direction are arranged distributed about the periphery on the free edge of the centering collar on the one first bearing disk between the outward moldings, wherein the other first bearing disk can be fixed by clipping these catch tabs on the centering collar of the one first bearing disk. Sufficient fixing of the other first bearing disk on the centering collar of the one first bearing disk is here already guaranteed by three catch tabs that are arranged at equal angular distances relative to each other and can be formed either as embossments or as punched points and thus are arranged on the centering collar so that the distance between their bottom sides and the axial side of the carrier part corresponds at least to the sheet thickness of the other first bearing disk.

In one useful refinement of the axial bearing assembly formed according to the invention, the additional recesses on the inner diameter of the carrier part have the shape of circular ring segments that are arranged distributed about the periphery of the inner diameter in an asymmetrical arrangement for preventing the faulty installation of the two first bearing disks on the carrier part. It has proven to be a sufficient measure here to arrange three such recesses on the inner diameter of the carrier part, with these recesses having an angular distance of 110°, 120°, and 130° of the full circle of 360° relative to each other. It would also be possible, however, to arrange more than three of these recesses at similar asymmetrical angular distances relative to each other on the inner diameter of the carrier part. It is also advantageous to form each of the recesses with different segment lengths, in order to exclude faulty installation of the two first bearing disks on the carrier part in an absolutely reliable manner.

According to the axial bearing assembly formed according to the invention is also characterized in that the outward moldings on the centering collar of the one first bearing disk, wherein these outward moldings are complementary to the recesses on the carrier part, are formed as embossments that are set out from its outer diameter side in the radial direction and are in the same quantity and have the same peripheral distribution as the recesses on the carrier part. Here, complementary to the recesses on the centering part is to be understood in that the embossments have the same cross-sectional shape and the same peripheral length as the recesses on the carrier part and advantageously extend over the entire axial length of the centering collar, wherein, however, embossments that are formed only in the free edge of the centering collar would also be conceivable. The complementary formation of the embossments on the centering collar of the one first bearing disk in the same number and peripheral distribution as the recesses on the carrier part then has the effect that the one first bearing disk of the one axial rolling bearing can be pushed into the carrier part only on the correct side of the carrier part into only a single possible angular position with its centering collar and is simultaneously arranged on the carrier part in a rotationally locked manner.

Another feature of the axial bearing assembly formed according to the invention is that the inward moldings on the inner diameter side of the other first bearing disk, wherein these inward moldings are complementary to the outward moldings on the centering collar, are formed as radial notches that are in the same quantity but have a mirror-inverted peripheral distribution than the outward moldings on the one first bearing disk. This identical formation of the radial notches in cross-sectional shape and peripheral length with the embossments on the centering collar also has the purpose that the second first bearing disk of the other axial rolling bearing can be pushed only with its correct axial side in only one single possible angular position onto the part of the centering collar projecting from the carrier part on the one first bearing disk and is simultaneously rotationally locked relative to this bearing disk and relative to the carrier part.

Finally, as an advantageous construction of the axial bearing assembly formed according to the invention that additional recesses are arranged for preventing damage to the catch tabs on the centering collar of the one first bearing disk on the inner diameter of the carrier part. These additional recesses are formed preferably with a semicircular shape corresponding to quantity, size, and peripheral distribution of the catch tabs, such that the catch tabs on the centering collar of the one first bearing disk can be guided through the inner diameter of the carrier part without contact during their installation on the carrier part.

In summary, the axial bearing assembly formed according to the invention thus has the advantage, compared with the axial bearing assemblies with two axial rolling bearings known in the prior art, that the carrier part and the bearing disks of the associated axial rolling bearings have a unique installation allocation that cannot be mixed up with each other through the formation with additional inward and outward moldings, by means of which the incorrect installation of any type is practically ruled out. In this way, the axial bearing arrangement according to the invention implements the Japanese Poka Yoke principle that is always a goal in engineering and comprises known technical precautions or devices for the immediate discovery and prevention of errors. Simultaneously, the two axial rolling bearings are connected to each other by means of the centering collar on the one first bearing disk of an axial rolling bearing in an advantageous way, so that the entire axial bearing assembly is formed as a captive structural unit that can be preassembled outside of the provided installation location. Because such a preassembled unit has less individual parts and requires less installation precision, its installation is also associated with a lower time expense and is therefore very economical.

BRIEF DESCRIPTION OF THE DRAWINGS

A preferred embodiment of the axial bearing assembly formed according to the invention is explained below in more detail with reference to the accompanying figures. Shown are.

DETAILED DESCRIPTION OF THE PREFERRED EMBODIMENTS

Figure 1:
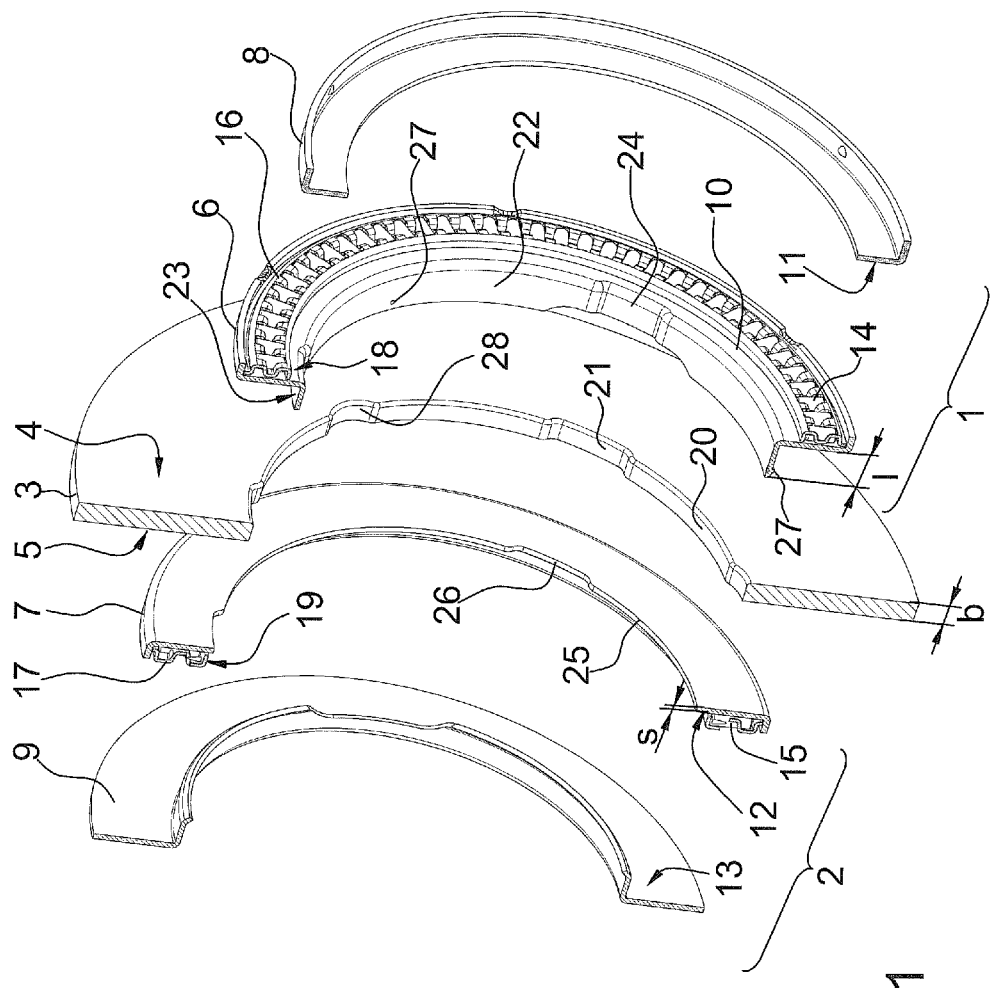
FIG. 1 an exploded view diagram of the longitudinally cut individual parts of the axial bearing assembly formed according to the invention, FIG. 2 an enlarged diagram of a top view of the axial bearing assembly formed according to the invention, FIG. 3 the section A-A according to FIG. 2 through the axial bearing assembly formed according to the invention, FIG. 4 an enlarged diagram of the detail X in section A-A according to FIG. 3, FIG. 5 an enlarged diagram of the detail Y in section A-A according to FIG. 3.

An axial bearing assembly provided for a passenger car automatic transmission follows from FIG. 1. This axial bearing assembly is made essentially of two axial rolling bearings 1, 2, wherein a circular ring-shaped carrier part 3 that is formed, for example, as a planet-wheel carrier is arranged between these axial rolling bearings. Here, each of the axial rolling bearings 1, 2 clearly has a first ring-shaped bearing disk 6, 7 adjacent to one of the axial sides 4, 5 of the carrier part 3 and a second bearing disk 8, 9, each of which is provided for mounting on additional components of the surrounding construction arranged on both sides of the carrier part 3 in the axial direction and is made from a thin steel sheet. A plurality of rolling bodies 14, 15 that are arranged one next to the other also roll between the axial inner sides 10, 11 and 12, 13 of the bearing disks 6, 7, 8, 9. These rolling bodies are each held by a bearing cage 16, 17 at a uniform spacing relative to each other and form, together with this cage, a needle-roller assembly 18, 19.

Figure 4:
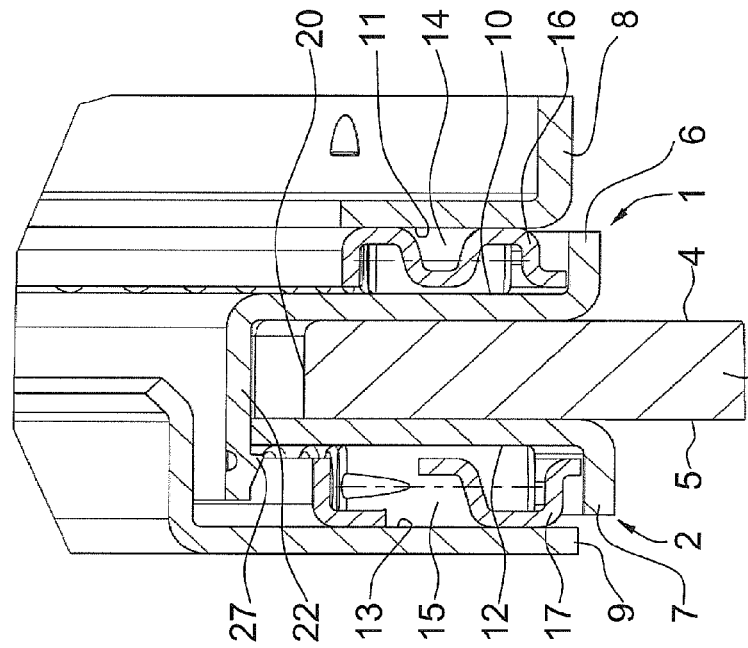

In addition, in FIG. 1 it is to be seen in connection with FIGS. 2 and 3 that, according to the invention, several additional recesses 21 are arranged on the inner diameter 20 of the circular ring-shaped carrier part 3 and the first bearing disks 6, 7 of both axial rolling bearings 1, 2 are connected to each other by means of a centering collar 22 that is on the one first bearing disk 6 and is guided through the inner diameter 20 of the carrier part 3 and are also mounted on the carrier part 3 in a captive and rotationally locked manner. To exclude incorrect installation in this connection, outward moldings 24 that are complementary to the recesses 21 on the carrier part 3 are arranged on the centering collar 22 of the one first bearing disk 6 and inward moldings 26 that are complementary to the outward moldings 24 on the centering collar 22 are arranged on the inner diameter side 25 of the other first bearing disk 7. As shown in FIG. 1, here the axial length l of the centering collar 22 on the one first bearing disk 6 is greater than the axial width b of the carrier part 3 plus the sheet thickness s of the other first bearing disk 7, while the outer diameter $D_Z$ of the centering collar 22 on the one first bearing disk 6, as shown in FIG. 4, is slightly smaller than the inner diameter $D_L$, $D_T$ of the other first bearing disk 7 and the carrier part 3.

Figure 5:
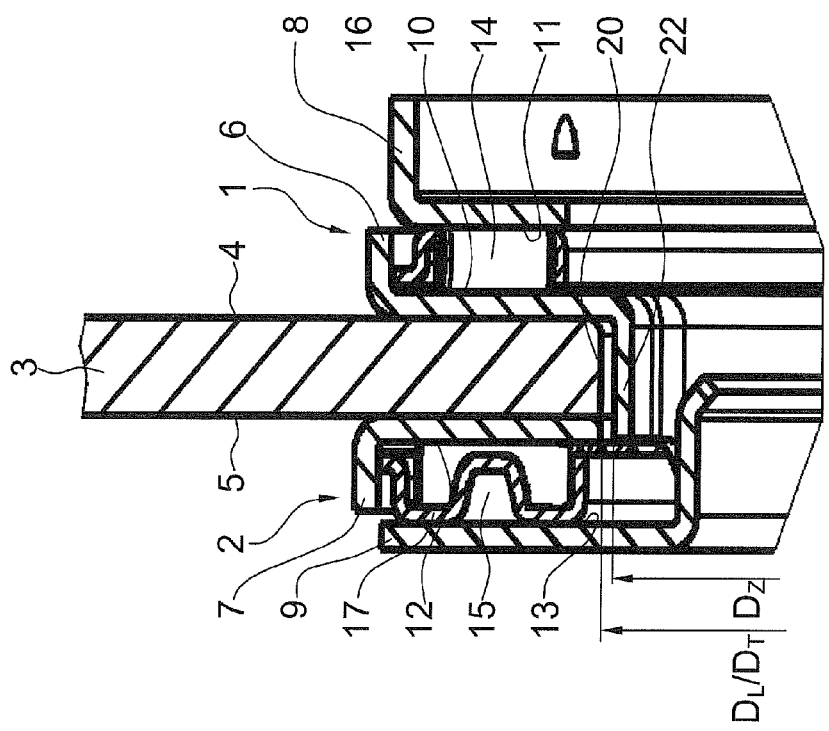

It is also visible from FIG. 1 that several catch tabs 27 that are directed outward in the radial direction are arranged distributed uniformly about the periphery on the free edge of the centering collar 22 on the one first bearing disk 6 between the outward moldings 24. These catch tabs 27 shown clearly in FIG. 5 are formed as three embossments arranged at equal angular distances relative to each other and are used to fix the other first bearing disk 7 by clipping on the centering collar 22 of the one first bearing disk 6.

It is also made clear by FIG. 1 that the additional recesses 21 on the inner diameter 20 of the carrier part 3 have the shape of circular ring segments that are arranged distributed about the periphery of the inner diameter 20 in an asymmetrical arrangement for preventing the incorrect installation of the two first bearing disks 6, 7 on the carrier part 3. Here it has proven sufficient to arrange three such recesses 21 on the inner diameter 20 of the carrier part 3, with these recesses having an angular distance of 110°, 120°, and 130° of the full circle of 360° relative to each other. However, in order to exclude incorrect installation of the two first bearing disks 6, 7 on the carrier part 3 with absolute certainty, each of the recesses 21 is also formed with different segment lengths.

It also follows from FIG. 1 that the outward moldings 24 on the centering collar 22 of the one first bearing disk 6, wherein these outward moldings are complementary to the recesses 21 on the carrier part 3, are similarly formed as embossments that are set off from its outer diameter side 23 in the radial direction and are in the same quantity and have the same peripheral distribution as the recesses 21 on the carrier part 3. Such a formation of the embossments on the centering collar 22 of the one first bearing disk 6 guarantees that the one first bearing disk 6 of the one axial rolling bearing 1 can be inserted, for example, only from the side of the carrier part 3 on the right in the drawing and only in a single possible angular position with its centering collar 22 in the carrier part 3 and in this way is simultaneously rotationally locked on the carrier part 3.

In contrast, the inward moldings 26 on the inner diameter side 25 of the other first bearing disk 7, wherein these inward moldings are complementary to the outward moldings 24 on the centering collar 22, are formed as radial notches, as can also be seen in FIG. 1, which are in the same quantity by have a mirror-inverted peripheral distribution than the outward moldings 24 on the one first bearing disk 6. This identical formation of the radial notches in cross-sectional shape and peripheral length with the embossments on the centering collar 22 also has the purpose that the second first bearing disk 7 of the other axial rolling bearing 2 can be pushed only with the axial side visible in the drawing in only a single possible angular position on the centering collar 22 projecting from the carrier part 3 on the one first bearing disk 6 and is simultaneously arranged in a rotationally locked manner relative to this bearing disk and relative to the carrier part 3.

Finally, it can also be identified in FIG. 1 that additional openings 28 are arranged on the inner diameter 20 of the carrier part 3 between the recesses 21, wherein these openings have a semicircular shape. These openings 28 are advantageously used for preventing damage to the catch tabs 27 on the centering collar 22 of the one first bearing disk 6 during their installation on the carrier part 3 and are arranged correspondingly in quantity and peripheral distribution of the catch tabs 27 on the inner diameter 20 of the carrier part 3, so that the catch tabs 26 can be guided through the carrier part 3 without contact.

| List of reference numbers | |
|---|---|
| 1 | Axial rolling bearing |
| 2 | Axial rolling bearing |
| 3 | Carrier part |
| 4 | Axial side of 3 |
| 5 | Axial side of 3 |
| 6 | First bearing disk of 1 |
| 7 | First bearing disk of 2 |
| 8 | Second bearing disk of 1 |
| 9 | Second bearing disk of 2 |
| 10 | Inner side of 6 |
| 11 | Inner side of 7 |
| 12 | Inner side of 8 |
| 13 | Inner side of 9 |
| 14 | Rolling body of 1 |
| 15 | Rolling body of 2 |
| 16 | Bearing cage of 1 |
| 17 | Bearing cage of 2 |
| 18 | Needle-roller assembly of 1 |
| 19 | Needle-roller assembly of 2 |
| 20 | Inner diameter of 3 |
| 21 | Recesses in 20 |
| 22 | Centering collar on 6 |
| 23 | Outer diameter side of 22 |
| 24 | Outward moldings in 23 |
| 25 | Inner diameter side of 7 |
| 26 | Inward moldings in 25 |
| 27 | Catch tabs on 22 |
| 28 | Additional recesses in 20 |
| l | Length of 22 |
| b | Width of 3 |
| s | Sheet thickness of 7 |
| $D_Z$ | Outer diameter of 22 |
| $D_L$ | Inner diameter of 7 |
| $D_T$ | Inner diameter of 3 |

The invention claimed is:

1. Axial bearing assembly, comprising two axial rolling bearings between which a circular ring-shaped carrier part is arranged, the circular ring-shaped carrier part having two axial sides, each of the axial rolling bearings has a first ring-shaped bearing disk adjacent to one of the axial sides of the carrier part and a second ring-shaped bearing disk provided for attachment to other components of a surrounding construction arranged axially on both sides of the carrier part, each of the bearing disks is made from a thin steel sheet and a plurality of rolling bodies arranged one next to another roll between axial inner sides of the bearing disks, the rolling bodies are each held by a bearing cage at a uniform spacing to each other and together form a needle-roller assembly, additional recesses are arranged on an inner diameter of the circular ring-shaped carrier part and the first bearing disks of both axial rolling bearings are connected to each other in a manner that prevents faulty assembly and are also attached on the carrier part in a captive and rotationally locked manner by a centering collar guided through the inner diameter of the carrier part on one of the first bearing disks and also by outward moldings on the centering collar of the one of the first bearing disks, wherein the outward moldings are complementary to the recesses on the carrier part, and by inward moldings on an inner diameter side of the other of the first bearing disks, wherein the inward moldings are complementary to the outward moldings on the centering collar, so that the carrier part together with the first bearing disks and the needle-roller assemblies located thereon are inherently alignable via the inward modlings, the outward moldings, and the recesses to form a pre-assembled unit.

2. Axial bearing assembly according to claim 1, wherein an axial length of the centering collar is formed on the one of the first bearing disks larger than an axial width (b) of the carrier part plus a sheet thickness (s) of the other of the first bearing disks.

3. Axial bearing assembly according to claim 2, wherein an outer diameter ($D_Z$) of the centering collar on the one of the first bearing disks is smaller than a respective inner diameter ($D_L$, $D_T$) of the other of the first bearing disks and the carrier part.

4. Axial bearing assembly according to claim 3, wherein several catch tabs that are directed outward in a radial direction are arranged distributed uniformly about a periphery on a free edge of the centering collar on the one of the first bearing disks between the outward moldings, and the other of the first bearing disks is fixed by clipping the catch tabs on the centering collar of the one of the first bearing disks.

5. Axial bearing assembly according to claim 4, wherein the additional recesses on the inner diameter of the carrier part have a shape of circular ring segments that have different segment lengths and are arranged distributed about the periphery of the inner diameter in an asymmetrical arrangement for preventing incorrect installation of the two first bearing disks on the carrier part.

6. Axial bearing assembly according to claim 5, wherein three of the recesses are arranged on the inner diameter of the carrier part and the three of the recesses have an angular spacing of 110°, 120°, and 130° of a full circle of 360° relative to each other.

7. Axial bearing assembly according to claim 5, wherein the outward moldings are on the centering collar of the one of the first bearing disks, the outward moldings are complementary to the recesses on the carrier part, are formed as embossments that are set out from an outer diameter side in a radial direction and are in a same quantity and have a same peripheral distribution as the recesses on the carrier part.

8. Axial bearing assembly according to claim 7, wherein the inward moldings that are complementary to the outward moldings on the centering collar are formed on an inner diameter side of the other first bearing disk as radial notches that are in a same quantity but have a mirror-inverted peripheral distribution relative to the outward moldings on the one of the first bearing disks.

9. Axial bearing assembly according to claim 8, wherein additional recesses that correspond in quantity and to the peripheral distribution of the catch tabs and through which the catch tabs are guided through the carrier part are arranged on the inner diameter of the carrier part for preventing damage to the catch tabs on the centering collar of the one of the first bearing disks.

* * * * *